Jan. 4, 1949.　　　V. E. MURRAY　　　2,457,912
EGG OPENER WITH AN ANNULAR CUTTING
FLANGE AND SUCTION CUP HOLDER
Filed Dec. 6, 1945
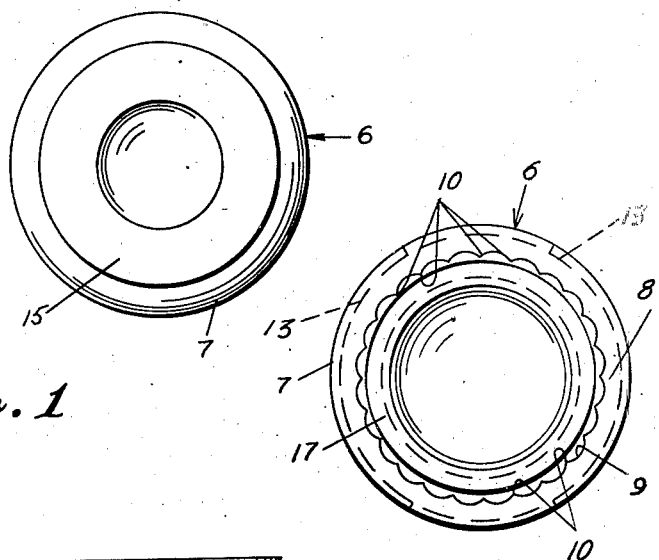
Fig. 1
Fig. 3
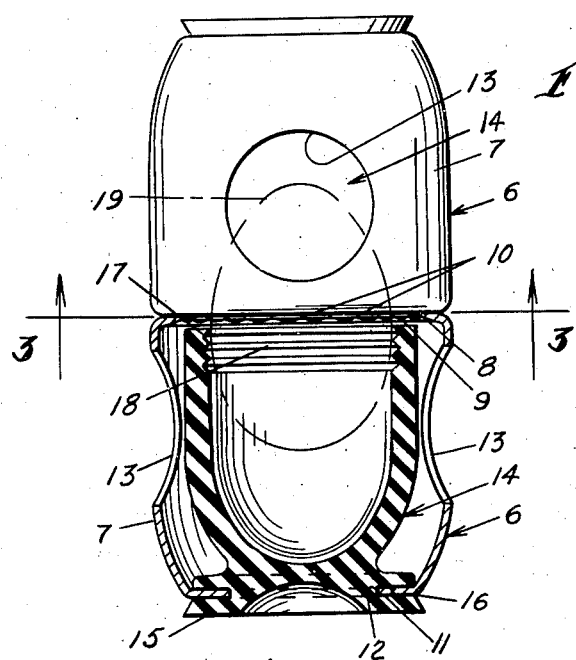
Fig. 2
INVENTOR.
Victor E. Murray.
BY
Murray, Sackhoff & Paddock.

Patented Jan. 4, 1949

2,457,912

UNITED STATES PATENT OFFICE 2,457,912

EGG OPENER WITH AN ANNULAR CUTTING FLANGE AND SUCTION CUP HOLDER

Victor E. Murray, Cincinnati, Ohio, assignor of three-fifths to W. O. Mashburn, Jr., and one-fifth to Robert Adair Black, both of Cincinnati, Ohio Application December 6, 1945, Serial No. 633,089

9 Claims. (Cl. 146—2)

The present invention relates to egg openers and has for an object the provision of a simple and inexpensively constructed implement whereby an egg may be quickly severed on a smaller diameter thereof, and its contents emptied, whereupon the shell may be ejected from the implement.

Another object of the invention is to provide a device of the class referred to which may be manipulated in a cleanly fashion soiling the fingers and without danger of dropping pieces of the egg shell into the contents thereof during operation.

Still another object of the invention is to provide means to handle and open a hot egg without burning the fingers.

These and other objects are attained by the means described herein and disclosed in the accompanying drawings in which:

Fig. 1 is a bottom plan view of a device embodying the invention.

Fig. 2 is an elevational view showing the pair of separable members forming the device of the invention, one of said members being shown in cross-section.

Fig. 3 is a top plan view of one of the members as taken on line 3—3 of Fig. 2.

Culinary implements have heretofore been devised for a purpose of severing the shell of an egg so that the contents may be removed. Most of these devices have resorted to the use of relatively complex elements for holding the egg while other elements, sometimes equally complicated, were utilized for cutting the shell. Amongst other objections to these previously known devices were the relative tediousness of manipulation and the difficulty in cleansing them after they became soiled.

By the present invention the various disadvantages attending the use of previously known egg openers are obviated.

As can be best seen in Fig. 2 the invention comprises a pair of identical members each indicated by reference character 6. These are interchangeably used in pairs, one member being fitted over each end of an egg to be opened and pushed together into abutment completely enclosing the egg.

A description of one member 6 will suffice.

The member 6 comprises a rigid outer shell 7, formed of any suitable hard material, for example seamless steel tubing, or molded material, the top of the shell 7 having an inturned substantially flat annular flange 8. The inner circumferential portion of the flange is tapered and its edge circumference 9 is suitably serrated to provide a series of relatively sharp teeth or points 10. At its bottom end the rigid shell 7 has an inturned flange 11 bounding a hole 12 in the bottom of said shell. At diametrically opposite sides of the shell, closely beneath the serrated flange 8 are large apertures or finger holes 13.

Disposed interiorly of each shell 7 is a cup 14 of rubber or other material which is non-porous and flexible and slightly stretchable. The cup 14 has an integral foot or base 15 with a circumferential slot 16 therein and into which the bottom flange 11 of rigid shell 7 is removably entered, leaving the lower portion of foot 15 outside the shell 7 to serve as a supporting foot for the composite member 6.

Cup 14 and shell 7 are thus connected in concentric relation, the exterior diameter of the cup being slightly smaller than the inside diameter of the shell 7 and the height of the cup being such that when the latter is flexed, the top edge 17 of the cup may move under the flange 8 of the shell 7. The top edge 17 of the cup may be slightly enlarged as shown so as to normally project partly under flange 8. Inside the mouth of the cup are suitable corrugations 18 (see Fig. 2) which insure a sort of suction grip when the large or small end of an egg 19 is forced into the cup.

In order to quickly and comfortably open an egg, whether raw or boiled, the opposite ends of the egg are entered into the respective cups 14 of a pair of the members 6 which are pushed together until the flanges 8 of the rigid shells 6 abut one another and the egg is completely enclosed (see Fig. 2). This can be accomplished without touching the egg with the fingers and the user is spared the discomfort of handling a hot boiled egg. The devices 6 are thus automatically centered by the enclosed egg and are held together by the suction of cups 14 which surround the minor circumference of the egg at opposite sides of the midsection thereof. The two members 6, thus positioned on and connected by the egg may now be grasped by the user whose hands may now move the rigid shells 6 in opposite directions and thus cause the serrated flanges 8 to pierce through diametrically opposite side of the shell of the egg and divide the latter without shattering into two parts which remain in the respective cups 14. In bringing the hands together in grasping the members 6 for this operation it will be found a very natural action on the part of the user to cross the thumbs and thus contact the relatively opposite member 6 with the thumb. The limited relative movement of the rigid shells required for dividing the egg is quite easily controlled because the user's hands are naturally brought into mutual contact by the act of grasping the two members 6 which are held together by the inserted egg.

During the operation of opening the egg, the rubber suction cups remain substantially horizontal and centered with the egg during the initial relative manual movement of the rigid shells 7, causing the serrated flanges to slide relative to each other and in doing so flex the cups 14 near their respective bases. When the shell of the egg is divided at the cutting line of the flanges 8 the user quickly turns the members 6 to an upright position without any liklihood of spilling the contents of the egg. The foot 15 of each member 6 permits the user to safely stand either or both of the members aside in preparation for emptying the contents from the respective open parts of the egg which are still held by suction in the respective cups 14. When the content is poured or scooped out of the half shell of the egg, the empty half shell is expelled in the following manner. The user inserts the thumb and forefinger through respective large apertures 13 in rigid shell 7 and compresses the cup 14, thus crushing the empty egg shell to relieve the suction, whereupon the crushed shell will usually fall from cup 14 when the latter is inverted. The mouth of cup 14 is of a size to snugly receive a small egg and will stretch sufficiently to accommodate a larger egg. In any event the egg is handled in a comfortable and cleanly manner without danger of egg shell fragments entering the content of the egg during opening and emptying of the egg. The operation is moreover very simple and rapid and since the devices are small and neat in appearance they may be used at the breakfast table as well as in the kitchen, regardless of whether one or many eggs are to be opened in a short space of time.

The simple but secure removable assembly of the parts makes it easy to separate the shell 7 from cup 14 for cleaning if the user so desires. It is to be noted however that the member 6 need not be dismantled in order to thoroughly cleanse them, because the mouth of the cup 14 can be manipulated and distorted for cleaning purposes in substantially the same manner as in expelling the empty egg shell. The holes in rigid shell 7 afford ready passage of water to and around the outside of the cup 14 and the inside of shell 7 below the flange 8.

What is claimed is:

1. An egg opener comprising a pair of like members each comprising a flexible suction cup and a continuous planar cutting ring of rigid material mounted for limited relative movement over the mouth of the suction cup, the respective cutting rings adapted for face to face abutment and relative surface sliding movement selectively in all directions whereby an egg substantially enclosed within the cooperating suction cups is completely severed in the plane of abutment of said rings, the suction cups yieldably shifting under the strain of the shearing cutting strain relative to the immediately adjacent portion of the associated ring.

2. An egg opener comprising a pair of like members each comprising a flexible suction cup and a cutting ring of rigid material having an internal continuous circular cutting edge mounted for limited relative movement over the mouth of the suction cup, the opening in the mouth of the cup being slightly smaller than the inside diameter of the cutting ring, the mouth of the cup being normally substantially concentric with the ring and immediately below the plane thereof whereby flexture of the cup under strain imparted thereto through an inserted egg may selectively yield the outer surface of an egg to the edge of the cutting ring.

3. In an egg opener the combination of a pair of like members each comprising a rigid shell member having a continuous inturned annular cutting flange, a flexible suction cup disposed in spaced, normally concentric relation within the shell, with the mouth of said cup being of smaller diameter than and disposed below the level of the cutting flange of said shell, and means on the bottom of the shell for connecting it with the bottom of said cup, said cups adapted to substantially enclose an inserted egg and to dispose the respective cutting rings in sliding abutment surrounding the egg, said rigid shell members being shiftable in relatively opposite directions whereby the inserted egg is completely sheared transversely in the plane of abutment of the cutting flanges.

4. An egg opener comprising a pair of footed cups of rubber like material conjointly adapted to enclose an egg from its opposite ends, a shell of rigid material connected to each cup at the foot thereof and concentrically surrounding the body of the cup, and an inturned cutting ring at the top of each shell and disposed in a plane immediately above the plane of the top of the associated cup, the footed cups being yieldable adjacent their respective connections with the associated rigid shell members whereby relative shifting of the cutting rings transversely of an inserted egg permits the mouths of said cups to independently assume eccentric relationship with the operative edges of the cutting rings.

5. An egg opener comprising a pair of footed cups of rubber like material conjointly adapted to enclose an egg from its opposite ends, a shell of rigid material connected to each cup at the foot thereof and concentrically surrounding the body of the cup, and an inturned cutting ring and extending substantially continuouly at the top of each shell and disposed in a plane immediately above the plane of the stop of the associated cup, the shells each having opposed finger openings affording access for manually collapsing the cup therein.

6. An egg opener comprising a pair of identical composite members each consisting of a rigid outer shell inturned at its top to provide an annular, toothed cutting ring, and a flexible suction cup connected to the shell at the base thereof only and disposed in normally concentric spaced relation within the shell with the mouth of the cup in closely spaced relation to the bottom of the said cutting ring said cutting rings being slidable relative to each other and an enclosed egg for completely shearing an egg in the plane of abutment of said rings.

7. An egg opener comprising a pair of identical composite members each consising of a rigid outer shell inturned at its top to provide an annular, toothed cutting ring, and a flexible suction cup connected to the shell at the base thereof only and disposed in normally concentric spaced relation within the shell with the mouth of the cup in closely spaced relation to the bottom of the said cutting ring, the flexible suction cups yielding to a position of eccentricity at the mouths thereof under shearing cutting strain upon an inserted egg, the shell having enlarged apertures at diametrically opposite sides affording digital access to the exterior of said suction cup.

8. An egg opener consisting of a pair of identical composite members, each member comprising a generally tubular shell of rigid material having inturned annular flat flanges at the top and bottom thereof, and a footed cup of rubber like material having a circumferential slot about the foot thereof for removably receiving the bottom flange of said shell, said shell surrounding the cup in spaced concentric relation above the foot, the top flange of said shell forming a serrated cutting edge normally concentric with the open top of the cup and disposed in a plane immediately above the plane of the top of said cup.

9. An egg opener consisting of a pair of identical composite members, each member comprising a generally tubular shell of rigid material having inturned annular flat flanges at the top and bottom thereof, and a footed cup of rubber like material having a circumferential slot about the foot thereof for removably receiving the bottom flange of said shell, said shell surrounding the cup in spaced concentric relation above the foot, the top flange of said shell forming a serrated cutting edge normally concentric with the open top of the cup and disposed in a plane immediately above the plane of the top of said cup, each cup adjacent its mouth being interiorly adapted for suctional retention of an end portion of an inserted egg, each shell being apertured on opposite sides affording digital access to the exterior sidewalls of the cup therein for expelling an empty egg shell from its suctionally held position in the mouth of the cup.

VICTOR E. MURRAY.

REFERENCES CITED

The following references are of record in the file of this patent:

UNITED STATES PATENTS

| Number | Name | Date |
| --- | --- | --- |
| 212,394 | Murphy | Feb. 18, 1879 |
| 808,507 | Blue | Dec. 26, 1905 |
| 900,908 | Bancroft | Oct. 13, 1908 |
| 2,283,390 | Seldomridge | May 19, 1942 |

Certificate of Correction

Patent No. 2,457,912.  January 4, 1949.

VICTOR E. MURRAY

It is hereby certified that error appears in the printed specification of the above numbered patent requiring correction as follows:

Column 4, line 48, for the word "stop" read *top*;

and that the said Letters Patent should be read with this correction therein that the same may conform to the record of the case in the Patent Office.

Signed and sealed this 19th day of April, A. D. 1949.

[SEAL]

THOMAS F. MURPHY,
*Assistant Commissioner of Patents.*